United States Patent
Suzuki et al.

[11] Patent Number: 5,833,158
[45] Date of Patent: Nov. 10, 1998

[54] RECORDING AND/OR REPRODUCING APPARATUS HAVING MEANS FOR SELECTIVELY LOADING LARGE OR SMALL TAPE CASSETTE

[75] Inventors: Kazuyoshi Suzuki; Toshio Mamiya; Katsuji Akimoto; Masaki Takase, all of Tokyo; Akihiro Uetake; Katsuaki Ikema, both of Kanagawa; Katsunori Takahashi, Tokyo, all of Japan

[73] Assignee: Sony Corporation, Tokyo, Japan

[21] Appl. No.: 791,225

[22] Filed: Jan. 30, 1997

[30] Foreign Application Priority Data

Feb. 5, 1996 [JP] Japan ................................... 8-018961

[51] Int. Cl.$^6$ .................................................. G03B 23/02
[52] U.S. Cl. ........................ 242/336; 242/338; 242/338.4; 360/94
[58] Field of Search ....................... 242/336, 338, 242/338.4; 360/94

[56] References Cited

U.S. PATENT DOCUMENTS

| | | | |
|---|---|---|---|
| 4,664,337 | 5/1987 | Shiratori et al. | 242/336 |
| 4,864,449 | 9/1989 | Inoue et al. | 360/94 X |
| 4,873,593 | 10/1989 | Baranski | 360/94 X |
| 4,984,109 | 1/1991 | Yokoo | 360/94 |
| 5,314,141 | 5/1994 | Ishii et al. | 360/94 X |
| 5,598,984 | 2/1997 | Lee et al. | 242/336 X |
| 5,692,695 | 12/1997 | Park | 242/336 |

*Primary Examiner*—Donald P. Walsh
*Assistant Examiner*—William A. Rivera
*Attorney, Agent, or Firm*—Frommer Lawrence & Haug LLP; William S. Frommer

[57] ABSTRACT

A recording and/or reproducing apparatus includes a rack mechanism by which a cassette compartment can be easily removed from a mechanical deck regardless of any position at which reel tables are moved. In a recording and/or reproducing apparatus such as a video cassette recorder in which a space between two reel tables can be moved by a reel table movement mechanism and small and large tape cassettes of different size are selectively mounted on the reel tables, a rack mechanism has a pair of parallel racks which can be relatively moved through a pinion, one rack has an engagement recess formed on one end portion thereof, the other rack has an engagement recess formed on one end portion thereof, the engagement recess being positioned over the one rack and a cassette compartment includes a drive lever which is moved in the height direction in response to the insertion of tape cassettes of different size. When the drive lever is lowered, the drive lever is engaged with the engagement recess of the one rack thereby to slidably move the rack member so that the reel tables are moved to the position corresponding to the small tape cassette. When the drive lever is elevated, the drive lever is engaged with the engagement recess of the other rack thereby to slidably move the rack so that the reel tables are moved to the position corresponding to the large tape cassette.

4 Claims, 8 Drawing Sheets

RECORDING AND/OR REPRODUCING APPARATUS HAVING MEANS FOR SELECTIVELY LOADING LARGE OR SMALL TAPE CASSETTE

BACKGROUND OF THE INVENTION

1. Field of the Invention

The present invention relates to a recording and/or reproducing apparatus for use with a consumer video cassette recorder (VCR) of compatible type in which a space between a pair of reel tables having a supply reel and a take-up reel around which a magnetic tape is wound as an information recording medium mounted thereon can be varied by a reel table movement mechanism so that more than two tape cassettes of different size can be selectively mounted on the reel tables. More particularly, this invention relates to a rack mechanism in which a reel table movement mechanism can be driven through movement of a cassette compartment and in which a cassette compartment can be easily removed from a mechanical deck regardless of any position at which the reel tables are moved.

2. Description of the Related Art

FIGS. 1 and 2 of the accompanying drawings show examples of this kind of conventional rack mechanism.

In FIG. 1, reference numeral 60 generally designates a rack mechanism disposed on a mechanical chassis 65. As shown in FIG. 1, the rack mechanism 60 comprises a first rack 61 having rack teeth 61a on one side surface and a second rack 62 having rack teeth 62a on one side surface. The first and second racks 61, 62 are disposed such that they are overlapped in the upper and lower direction. The first and second racks 61, 62 have guide slits 63, 64 vertically defined in substantially the whole length, and two guide pins 66, 66 are erected from the mechanical chassis 65. Therefore, the first and second racks 61, 62 are supported by the two guide pins 66, 66 fitted into the guide slits 63, 64 so as to become relatively movable.

A pinion 68 is meshed with the rack teeth 61a of the first rack 61, and a pinion 69 is meshed with the rack teeth 62a of the second rack 62. The two pinions 68, 69 also are meshed with each other. Then, as the pinion 68 which is meshed with the rack teeth 61a of the first rack 61 is rotated, a reel table movement mechanism (not shown) is driven through a drive gear (not shown).

The first and second racks 61 and 62 are slid by a drive lever 70. The drive lever 70 is disposed on a cassette holder of a cassette compartment (not shown) and moved as the cassette holder is linearly moved in the front or back direction.

FIG. 1 shows the manner in which a drive pin 70a of the drive lever 70 presses the end face of the first rack 61 and slides the first rack 61 thereby to translate reel tables (not shown) up to the small tape cassette corresponding position. FIG. 2 shows the manner in which the drive pin 70a of the drive lever 70 presses the end face of the second rack 62 and slides the second rack 62 thereby to translate reel tables (not shown) up to the large tape cassette corresponding position.

According to the rack mechanism 60, under the condition that the racks 61, 62 are located at the small tape cassette corresponding position shown in FIG. 1, the drive pin 70a of the drive lever 70 is placed below the second rack 62. Therefore, when a user wishes to remove the cassette compartment from the mechanical chassis, the drive pin 70a of the drive lever 70 is caught by the rear surface of the second rack 62 so that the cassette compartment cannot be removed from the mechanical chassis. In order to remove the cassette compartment from the mechanical chassis, the cassette holder in the cassette compartment should be linearly translated in the backward until the drive pin 70a of the drive lever 70 is released from the end face of the second rack 62 or the cassette compartment can be removed from the mechanical chassis only under the condition that the rack mechanism 60 is translated to the large tape cassette corresponding position as shown in FIG. 2. Therefore, the rack mechanisms 60 shown in FIGS. 1 and 2 are not satisfactory from an assembly efficiency standpoint and a serviceability standpoint.

SUMMARY OF THE INVENTION

In view of the aforesaid aspect, it is an object of the present invention to provide a recording and/or reproducing apparatus including a rack mechanism in which a cassette compartment can be easily removed from a mechanical deck regardless of any position at which reel tables are moved.

It is another object of the present invention to provide a recording and/or reproducing apparatus including a rack mechanism in which an assembly efficiency and a serviceability can be improved.

According to the present invention, there is provided a recording and/or reproducing apparatus in which a supply reel and a take-up reel around which a magnetic tape is wound as an information recording medium are mounted on a pair of reel tables, a pair of reel tables are supported by reel table holding members, a space between the reel tables can be varied by a reel table movement mechanism, more than two tape cassettes of different size can be selectively attached to the reel tables and a drive source of the reel table movement mechanism is obtained from a rack mechanism which is slidably moved in unison with a movement of a cassette holder. The recording and/or reproducing apparatus includes a rack mechanism by which a cassette compartment having a cassette holder can be easily removed from a chassis base forming a mechanical deck regardless of any position at which the reel tables are moved.

According to the present invention, when the reel tables are placed at positions corresponding to the tape cassettes of different size or placed at somewhere of positions corresponding to the tape cassettes of different size, the cassette compartment can be easily removed from the mechanical deck.

According to the present invention, the rack mechanism includes a pair of racks. A pair of racks are parallel to each other and can be relatively moved through a pinion. One rack has an engagement recess formed at one end portion thereof. The other rack has an engagement recess formed at one end portion thereof and this engagement recess can be lifted over the one rack. The cassette holder has a drive lever which can be moved in the height direction in response to the insertion of tape cassettes of different size. When the drive lever is lowered, the drive lever is engaged with the engagement recess of one rack thereby to slidably move the one rack and the drive lever passes the engagement recess of the other rack. When the drive lever is elevated, the drive lever is engaged with the engagement recess of the other thereby to slidably move the other rack.

According to the present invention, regardless of any position corresponding to tape cassettes of different size or somewhere of position corresponding to tape cassettes of different size at which the two racks are moved, the drive lever can be prevented from being disturbed by the racks, and hence the cassette compartment can be easily removed from the mechanical deck.

Further, according to the present invention, since one rack of the rack mechanism moves the reel table space to the position corresponding to the small tape cassette and the other rack moves the reel table space to the position corresponding to the large tape cassette, it is possible to move the reel table space to the positions corresponding to the tape cassettes of different size by selectively moving the two racks.

Furthermore, according to the present invention, the drive lever is not contacted with the small tape cassette and lowered when the small tape cassette is inserted into the cassette holder. Also, the drive lever is pushed upwardly and elevated when the large tape cassette is inserted into the cassette holder. Therefore, the drive lever can be reliably elevated or lowered in response to the size of the tape cassettes.

DETAILED DESCRIPTION OF THE PREFERRED EMBODIMENT

A rack mechanism for a recording and/or reproducing apparatus according to the present invention will hereinafter be described with reference to the drawings. In the present invention, the rack mechanism is applied to a consumer video cassette recorder (VCR) of a compatible type.

Initially, a mechanical deck of VCR will be described with reference to FIGS. 3 and 4.

Figure 1:
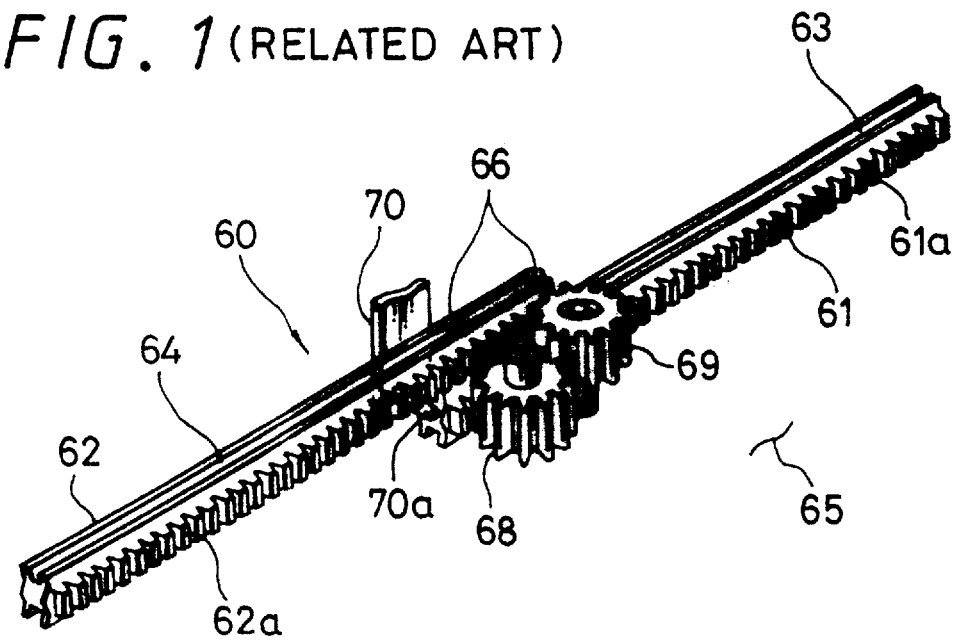
FIG. 1 is a perspective view illustrating the manner in which a conventional rack mechanism and a drive lever are driven when reel tables are moved to the small tape cassette corresponding position.
Figure 2:
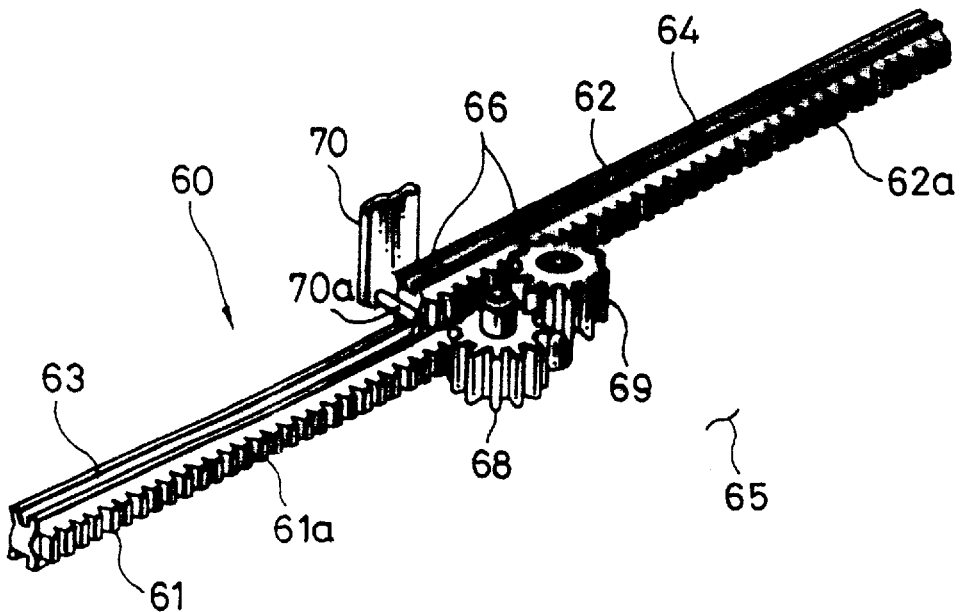
FIG. 2 is a perspective view illustrating the manner in which the conventional rack mechanism and the drive lever are driven when reel tables are moved to the large tape cassette corresponding position.
Figure 3:
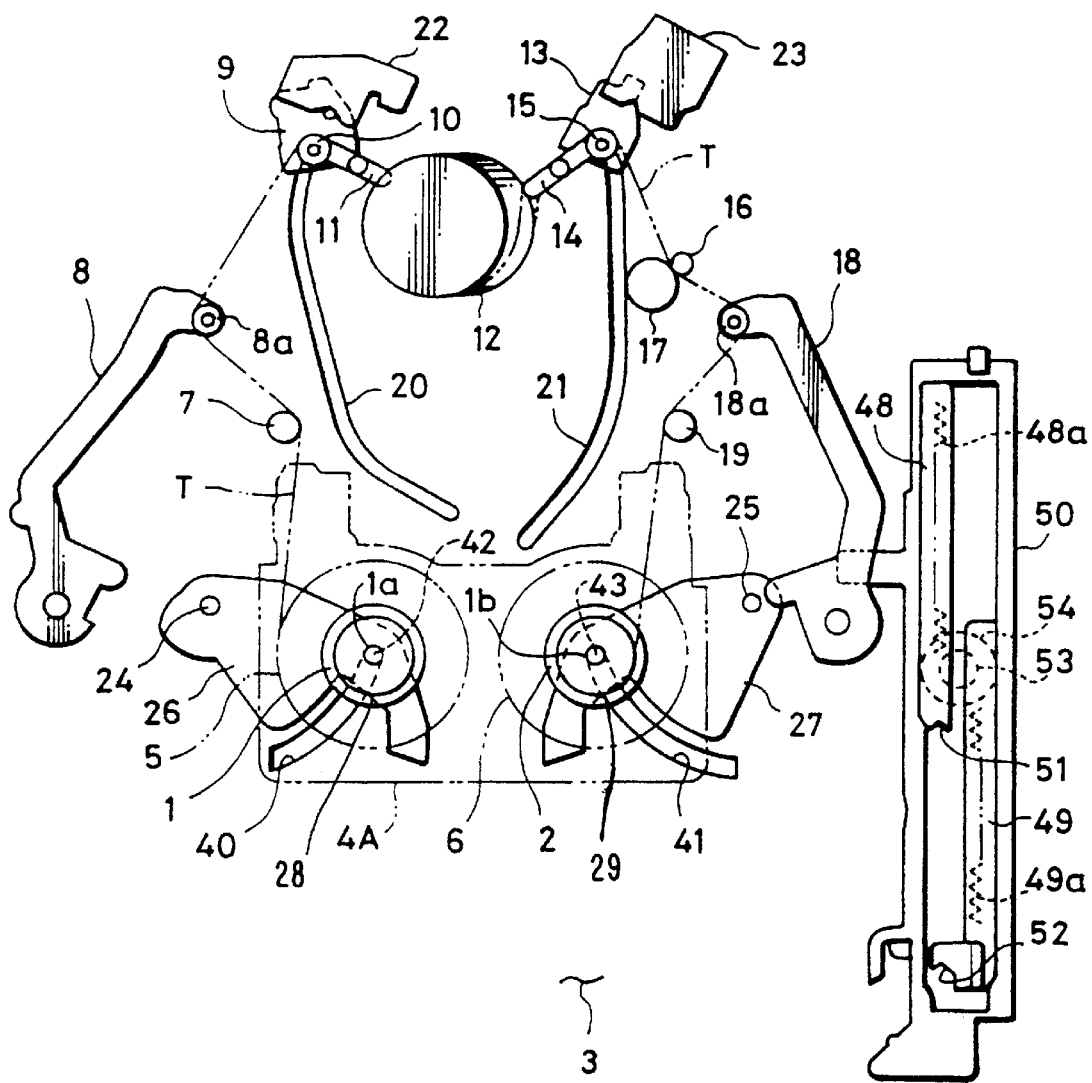
FIG. 3 is a plan view of a main portion of a mechanical deck of a video cassette recorder to which the present invention is applied, and illustrating the manner in which the mechanical deck is operated when a small tape cassette is loaded into a cassette holder.

FIG. 3 is a plan view of a main portion of a mechanical deck of the VCR according to the present invention, and illustrating the manner in which a small tape cassette 4A is loaded onto a cassette holder. FIG. 4 is a like plan view of a main portion of a mechanical deck of the VCR according to the present invention, and illustrating the manner in which a large tape cassette 4B is loaded onto a cassette holder.

A manner in which a tape transport system of VCR is operated when the small tape cassette 4A is loaded into the cassette holder will be described with reference to FIG. 3.

As shown in FIG. 3, a pair of supply reel table 1 and take-up reel table 2 are disposed on a mechanical chassis 3. A supply reel 5 and a take-up reel 6 for the small tape cassette 4A are attached to the two reel tables 1 and 2 as shown by phantom circles in FIG. 3.

A magnetic tape T that is unreeled from the supply reel 5 of the small tape cassette 4A is transported from a guide roller 7 along a roller 8a of a tension regulator 8 provided on the supply side through a vertical guide 10 and an inclined guide 11 supported to a slide member 9, and is helically wound around a rotary drum 12 having magnetic heads (not shown) from the entrance of the rotary drum 12. Then, the magnetic tape T is unreeled from the exit of the rotary drum 12, transported through an inclined guide 14 and a vertical guide 15 supported on a slide member 13 along a capstan 16 and a pinch roller 17 and is rewound around the take-up reel 6 from a roller 18a of a tension regulator 18 on the rewind side, thus making a tape transport system.

The two slide members 9, 13 can be slidably moved to the loading position and the unloading position by a loading gear (not shown) through links along slide grooves 20, 21 defined in the mechanical chassis 3. The two slide members 9, 13 are positioned to fixed blocks 22, 23 at the loading position.

The two reel tables 1, 2 are rotatably supported by reel table supporting shafts 28, 29 erected from reel table holding members 26, 27 which are rotatable about fulcrum pins 24, 25. As a result, a reel table space between the two reel tables 1, 2 can be positioned at the positions corresponding to the small tape cassette 4A and the large tape cassette 4B by rotation of the two reel table holding members 26, 27.

The two reel tables 1, 2 are supported to the reel table holding members 26, 27 which are rotated about the fulcrum pins 24, 25. Specifically, the reel table space between the two reel tables 1 and 2 can be varied by rotation of the two reel table holding members 26, 27. The space between the two reel tables 1 and 2 can be varied by a reel table movement mechanism 30.

Figure 5:
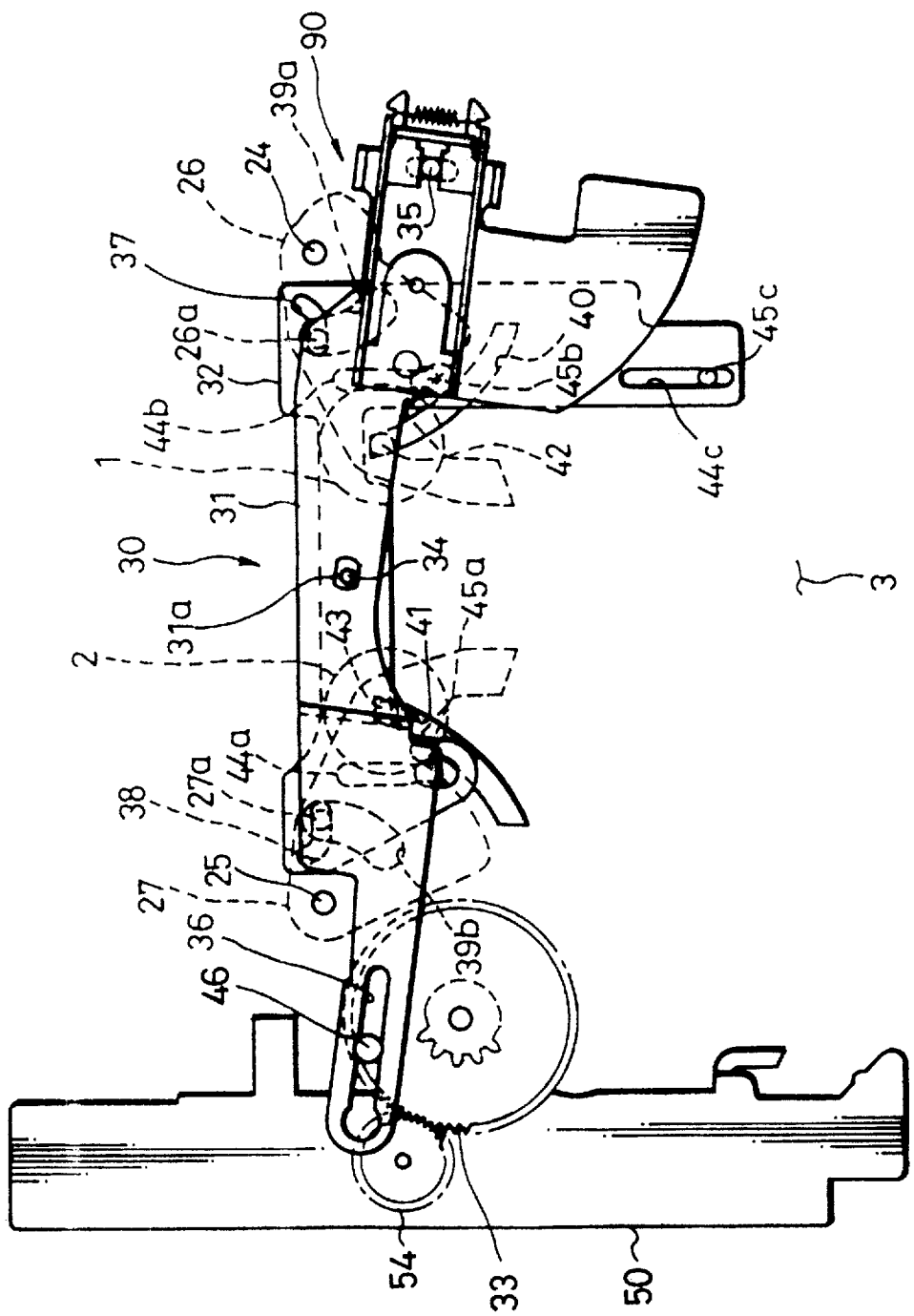
FIG. 5 is a plan view illustrating a reel table movement mechanism from the rear surface of the mechanical chassis, and illustrating the manner in which the reel table movement mechanism is operated when a small tape cassette is loaded into a cassette holder.
Figure 6:
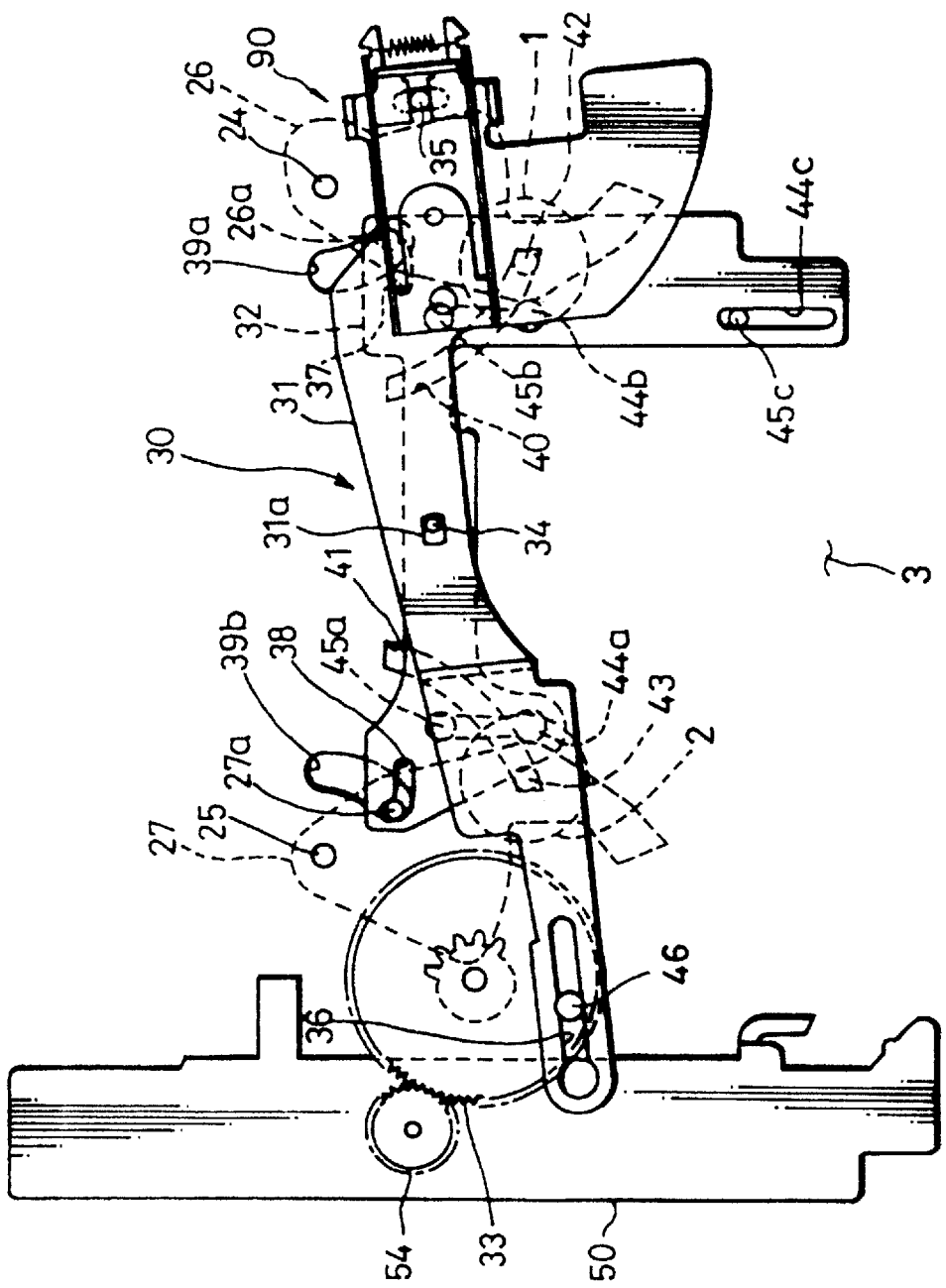
FIG. 6 is a plan view illustrating a reel table movement mechanism from the rear surface of the mechanical chassis, and illustrating the manner in which the reel table movement mechanism is operated when a large tape cassette is loaded into a cassette holder.

FIGS. 5 and 6 are plan views illustrating the reel table movement mechanism 30 from the rear side of the mechanical chassis 3. FIG. 5 shows the manner in which the reel table movement mechanism 30 is operated when the small tape cassette 4A is loaded into the cassette holder, and FIG. 6 shows the manner in which the reel table movement mechanism 30 is operated when the large tape cassette 4B is loaded into the cassette holder.

As illustrated, the reel table movement mechanism 30 comprises a first arm member 31, a second arm member 32 and a drive gear 33.

The first arm member 31 and the second arm member 32 disposed on the rear side of the first arm member 31, i.e. on the mechanical chassis 3 side are coupled at substantially the intermediate portion by a shaft pin 34. A shaft aperture of the first arm member 31 is bored as a loose aperture 31a. A base end portion (right-hand end portion in FIG. 5) of the first arm member 31 is rotatably supported by a shaft pin 35 erected from the mechanical chassis 3, and the first arm member 31 has a guide elliptical aperture 36 defined in its tip end.

The second arm member 32 has symmetrical cam apertures 37, 38 of inverted V configuration defined in their respective end portions. Rotary pins 26a, 27a which were vertically elongated from the reel table holding members 26, 27 are engaged with the cam apertures 37, 38. The mechanical chassis 3 has escape apertures 39a, 39b defined therein at the positions corresponding to a range in which the rotary pins 26a, 27a can be moved. When the reel table holding members 26, 27 are rotated about the fulcrum pins 24, 25, rotary central shafts 42, 43 of the reel tables 1, 2 are moved along arcuate apertures 40, 41 defined in the mechanical chassis 3. Guide apertures 44a, 44b and 44c are used to enable the second arm member 32 to be translated in parallel, and are in engagement with shafts 45a, 45b and 45c disposed on the mechanical chassis 3.

On the tip end side of the first arm member 31, the above-mentioned drive gear 33 is rotatably supported to the mechanical chassis 3. A drive pin 46 protruded from the gear side surface of the drive gear 33 is in engagement with the guide elliptical aperture 36 of the first arm member 31.

The reel tables 1, 2 are spring-biased to the small tape cassette corresponding position and the large tape cassette corresponding position under spring force of a reel table limit mechanism 90. The reel table limit mechanism 90 is not important in the present invention and therefore need not be described.

A driving source for driving the reel table movement mechanism 30 is obtained from an inventive rack mechanism 47 which is slidably moved in unison with the front linear operation (loading operation) of the cassette compartment.

Figure 4:
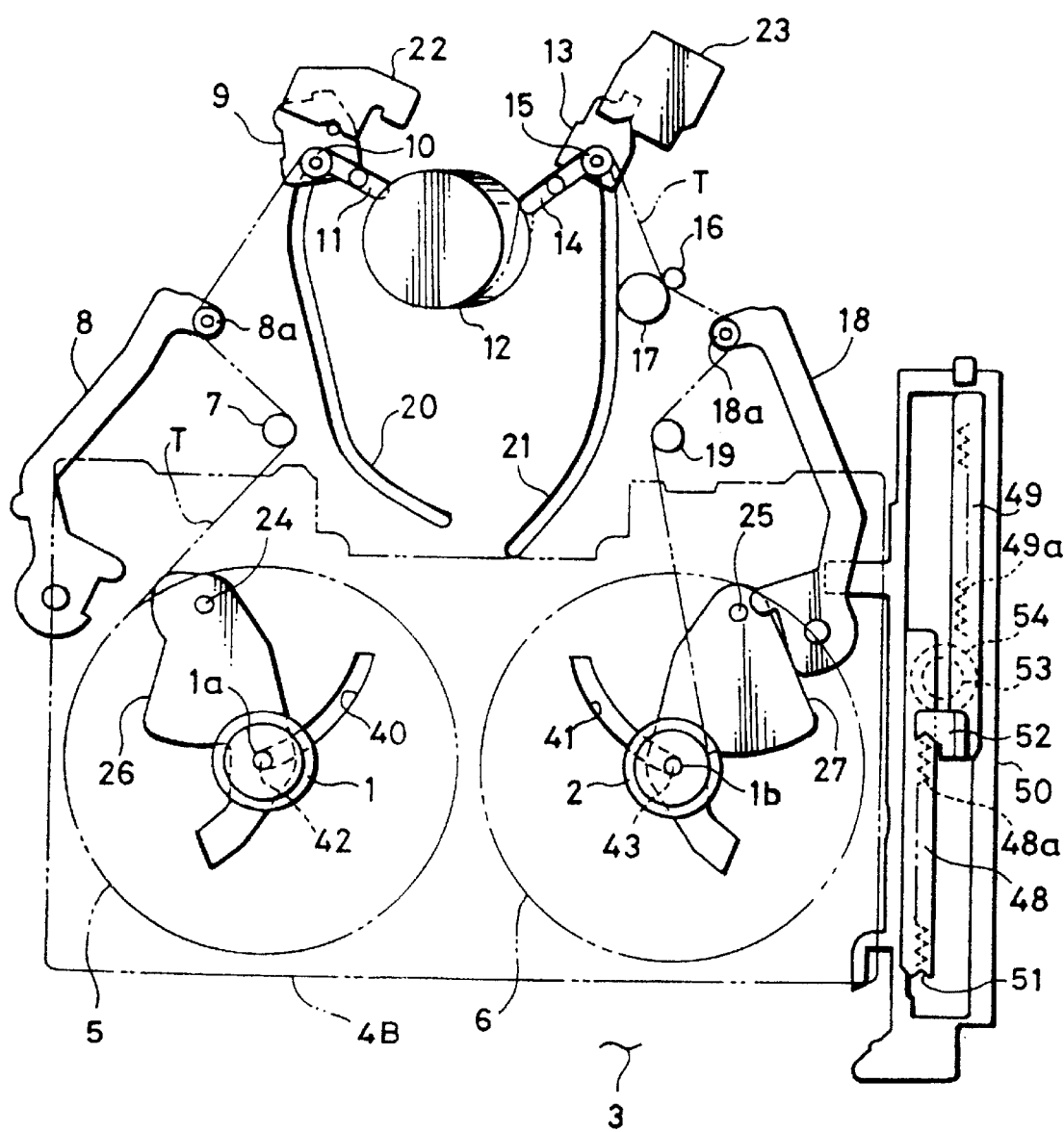
FIG. 4 is a plan view of a main portion of a mechanical deck of a video cassette recorder to which the present invention is applied, and illustrating the manner in which the mechanical deck is operated when a large tape cassette is loaded into a cassette holder.
Figure 7:
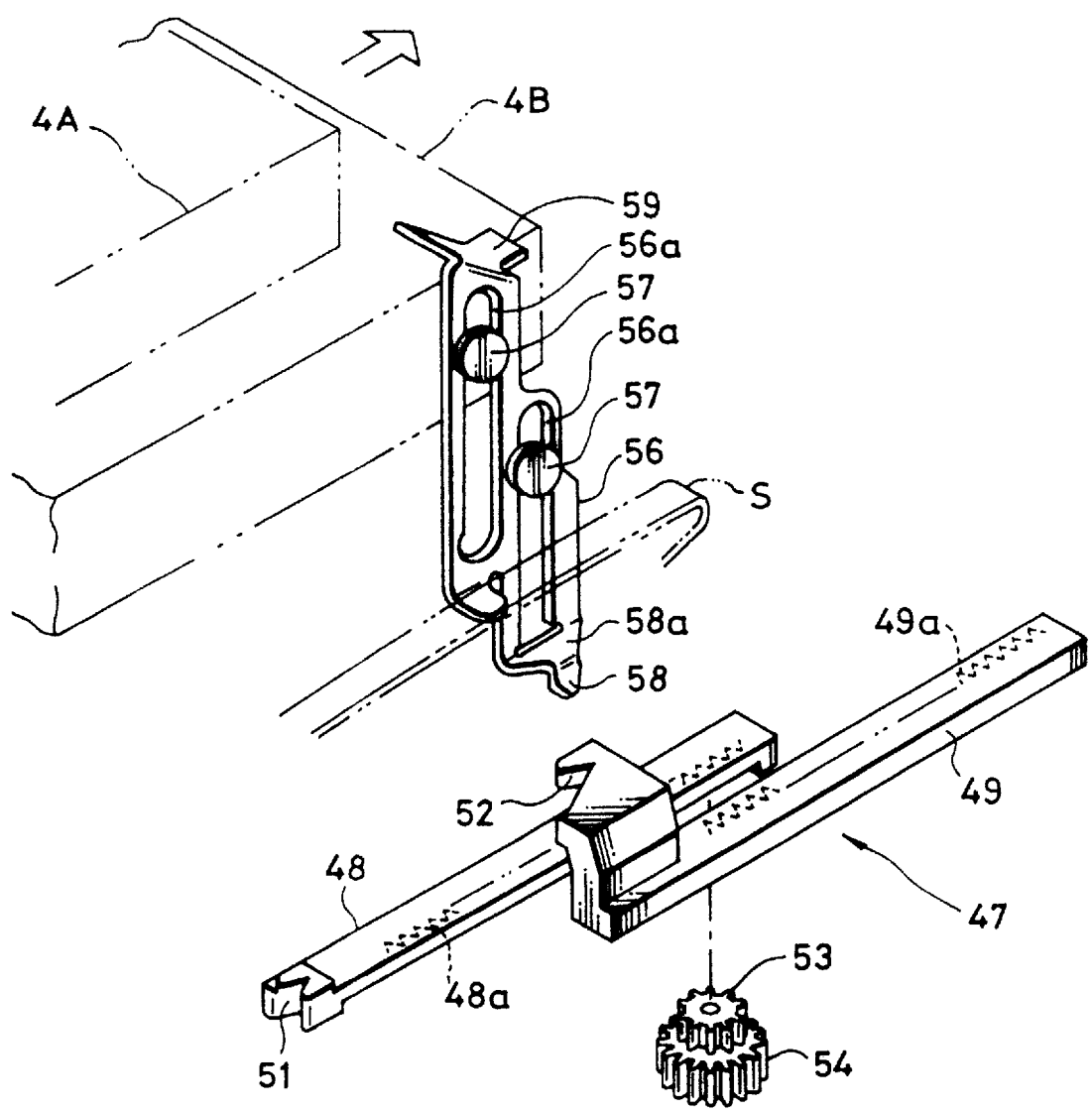
FIG. 7 is a perspective view illustrating a rack mechanism and a drive lever of a cassette compartment according to the present invention.

The rack mechanism 47 is arranged as shown in FIGS. 3, 4 and 7. A pair of racks 48, 49 which are disposed in parallel are housed in a rack holder 50. The rack 48 has an engagement recess 51 of substantially V configuration formed at its end portion. The other rack 49 has an engagement recess 52 of substantially V configuration formed on its end portion. The engagement recess 52 is elevated so as to make a straight line with the engagement recess 51 above the rack 48.

The racks 48, 49 have rack teeth 48a, 49a formed on their opposing sides. The rack teeth 48a, 49a are meshed with a pinion 53 supported on the mechanical chassis 3. The pinion 53 has an output pinion 54 coaxially integrated therewith, and the output pinion 54 is meshed with the drive gear 33 of the reel table movement mechanism 30.

Figure 8:
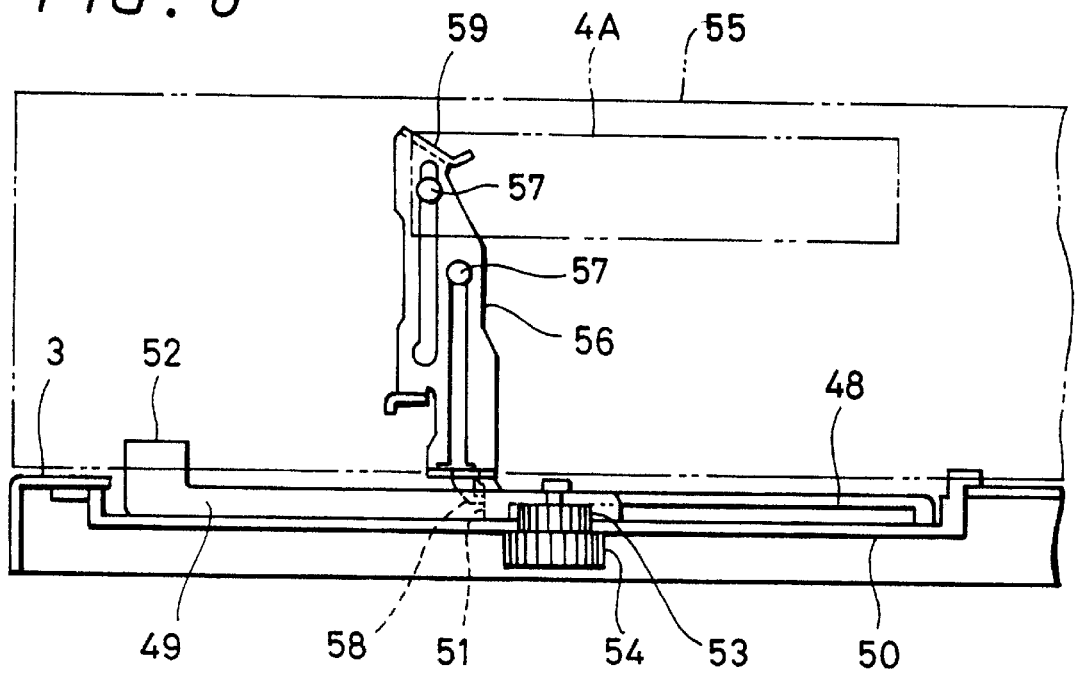
FIG. 8 is a side view of a rack mechanism and a drive lever of a cassette compartment, and illustrating the manner in which the rack mechanism and the drive lever are operated when a small tape cassette is loaded into a cassette holder.
Figure 9:
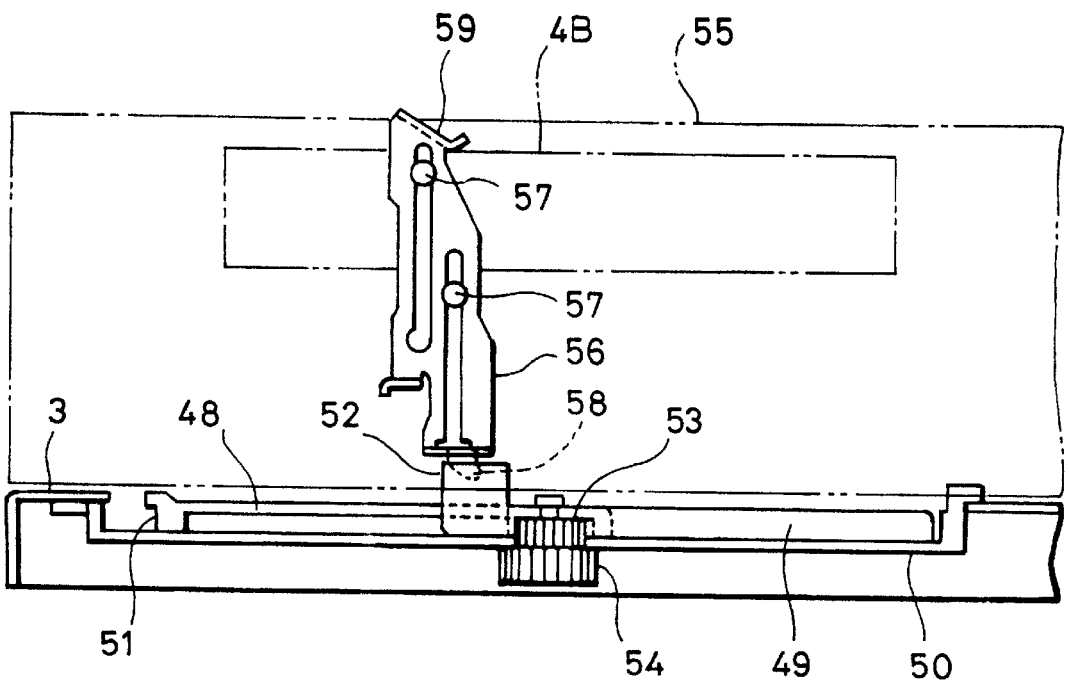
FIG. 9 is a side view of a rack mechanism and a drive lever of a cassette compartment, and illustrating the manner in which the rack mechanism and the drive lever are operated when a large tape cassette is loaded into a cassette holder.

In FIGS. 8 and 9, reference numeral 55 generally designates a cassette compartment. The cassette compartment 55 includes a drive lever 56 supported to a cassette holder (not shown). As shown in FIG. 7, this drive lever 56 has parallel guide apertures 56a, 56a which can be moved along guide pins 57, 57 of the cassette holder in the upper and lower direction. In the lower end portion of the drive lever 56, a downward engagement member 58 is formed at the tip end portion of a bent member 58a which is bent horizontally. Moreover, the drive lever 56 has on its upper end portion an operation tab 59 which is pushed upwardly when the large tape cassette 4A passes the operation tab 59. The drive lever 56 is constantly spring-biased in the lower direction under spring force of a plate spring S.

A series of operation of the cassette compartment 55 and the reel table movement mechanism 30 on the mechanical deck side will be described below.

FIG. 8 shows the rack mechanism 47 and the drive lever 56 operated when the small cassette tape 4A is inserted into a cassette holder, not shown, of the cassette compartment 55 and moved in the front direction so that the rack mechanism 47 and the drive lever 56 are placed at the small tape cassette corresponding position. This position corresponds to the operation positions of the racks 48, 49 shown in FIG. 3.

Specifically, when the small tape cassette 4A is inserted into the cassette holder of the cassette compartment 55, the small tape cassette 4A is inserted into the position which does not correspond to the drive lever 56 as shown in FIG. 7 so that the drive lever 56 is spring-biased in the lower direction under spring force of the plate spring S. As a consequence, the engagement member 58 at the lower end portion of the drive lever 56 faces the engagement recess 51 of the rack 48.

Figure 10:
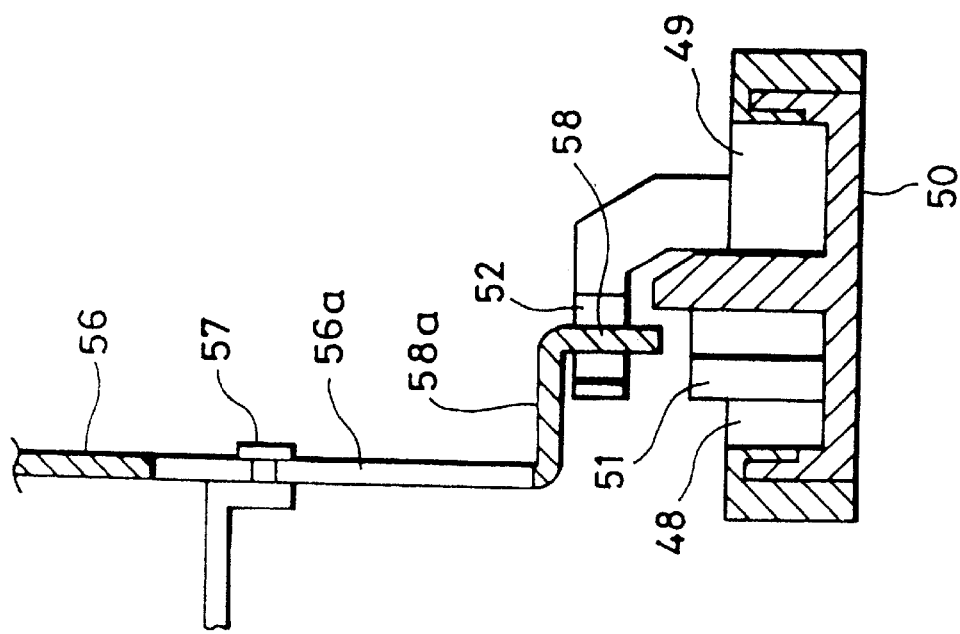
FIG. 10 is a front view of a rack mechanism and a drive lever of a cassette compartment, and illustrating the manner in which the rack mechanism and the drive lever are operated when a small tape cassette is loaded into a cassette holder.

Thus, when the cassette holder is loaded into the cassette compartment 55 under the condition that the small tape cassette 4A is inserted into the cassette holder, the drive lever 56 also is operated in unison and the engagement member 58 formed on the lower end portion of the drive lever 56 is engaged with the engagement recess 51 of the rack 48, thereby sliding the rack 48. At that time, because the upper portion of the engagement member 58 has the bent portion 58a, the drive lever 56 is not abutted against the engagement recess 52 of the other rack 49 elevated over the rack 48 and can be passed satisfactorily as shown in FIG. 10.

In this manner, as the rack 48 is moved in the forward direction, the other rack 49 is moved in the rearward direction through the pinion 53 (see FIGS. 3 and 9), whereby the output pinion 54 is rotated together with the pinion 53 meshing with the rack teeth 48a, 49a, thus the reel table movement mechanism being driven.

Specifically, when the drive gear 33 is rotated in the clockwise direction as the output pinion 54 is rotated at the position corresponding to the large tape cassette 4B shown in FIG. 6, the first arm member 31 is rotated about the shaft pin 35 in the clockwise direction through the guide elliptical aperture 36 which is in engagement with the drive pin 46 rotating in unison with the drive gear 33 and the second arm member 32 also is rotated in unison because the second arm member 34 is coupled by the shaft pin 34. At that time, the second arm member 32 is guided by the shafts 45a, 45b, 45c and parallelly moved in the upper direction of FIG. 6, thereby rotating the rotary pins 26a, 27a of the reel table holding members 26, 27 engaged with the cam apertures 37, 38 formed on the second arm member 32. As a result, the reel table holding members 26, 27 are rotated about the fulcrum pins 24, 25, whereby the reel tables 1, 2 are moved to the position corresponding to the small tape cassette 4A as shown in FIG. 5.

Although the drive lever 56 is moved in the rearward in unison with the unloading of the cassette holder from the cassette compartment 55, the racks 48, 49 remain at the position corresponding to the small tape cassette 4A shown in FIGS. 3 and 8.

FIG. 9 shows the manner in which the rack mechanism 47 and the drive lever 56 are operated when the large tape cassette 4B is inserted into the cassette holder of the cassette compartment 55 and in which the cassette holder is loaded onto the cassette compartment 55 and the rack mechanism 47 and the drive lever 56 are placed at the position corresponding to the large tape cassette 4B. The positions in FIG. 9 correspond to the operation positions of the racks 48, 49 shown in FIG. 4.

When the large tape cassette 4B is inserted into the cassette holder of the cassette compartment 55 from a cassette insertion mouth (not shown), the operation member 59 of the drive lever 56 is pushed upwardly against spring force of the plate spring S by the large tape cassette 4B as shown in FIG. 7 so that the engagement member 58 formed on the lower end portion of the drive lever 56 is opposed to the engagement recess 52 of the other rack 49 which is lifted over the rack 48.

Figure 11:
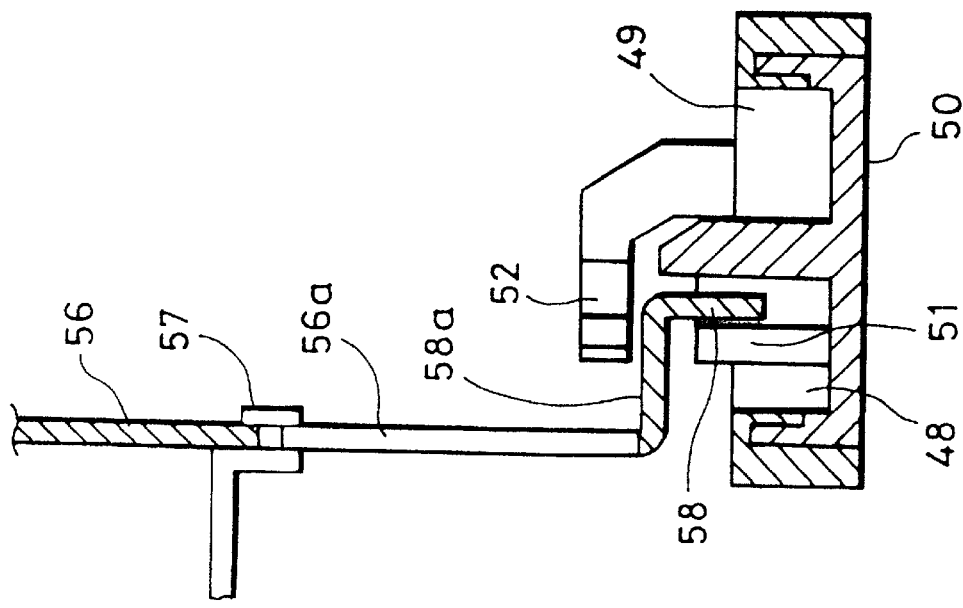
FIG. 11 is a front view of a rack mechanism and a drive lever of a cassette compartment, and illustrating the manner in which the rack mechanism and the drive lever are operated when a large tape cassette is loaded into a cassette holder.

Thus, when the cassette holder is loaded onto the cassette compartment 55 under the condition the large tape cassette 4B is inserted into the cassette holder, the drive lever 56 is moved in unison so that the engagement member 58 formed on the lower end portion of the drive lever 56 is engaged with the engagement recess 52 of the other rack 49, thereby slidably moving the rack 49 as shown in FIG. 11. Therefore, as the other rack 49 is moved in the forward direction, the rack 48 is moved in the backward direction through the pinion 53 (see FIGS. 4 and 9) and the output pinion 54 is rotated together with the pinion 53 meshed with both the rack teeth 48a, 49a, resulting in the reel table movement mechanism 30 being driven.

Specifically, at the position corresponding to the small tape cassette 4A shown in FIG. 5, when the drive gear 33 is rotated in the counter-clockwise direction as the output pinion 54 is rotated, the first arm member 31 is rotated about the shaft pin 35 in the counter-clockwise direction through the guide elliptical aperture 36 engaged with the drive pin 47 which is rotated in unison with the drive gear 33 and the second arm member 32 which is coupled to the first arm member 31 by the shaft pin 34 also is rotated in unison. At that time, the second arm member 32 is parallelly moved along the shafts 45a, 45b, 45c in the lower direction of FIG. 5, thereby driving the rotary pins 26a, 27a of the reel table holding members 26, 27 engaged with the cam apertures 37, 38 defined in the second arm member 32. Accordingly, the reel table holding members 26, 27 are rotated about the fulcrum pins 24, 25, whereby the reel tables 1, 2 are moved to the position corresponding to the large tape cassette 4B as shown in FIG. 6.

Although the drive lever 56 is moved in the backward as the cassette holder is being unloaded from the cassette compartment 55, the racks 48, 49 remain at the position corresponding to the large tape cassette 4B as shown in FIGS. 4 and 9.

As described above, according to the present invention, there is provided the rack mechanism 47 in which the drive source of the reel table moving mechanism 30 is obtained from the drive lever 56 which is operable in unison with the movement of the cassette compartment 55 and which slidably operates the racks 48, 49 through the output pinion 54. Therefore, regardless of any position or somewhere of any position corresponding to the small tape cassette 4A or the large tape cassette 4B at which the reel tables 1, 2 are moved, the drive lever 56 can be lifted and removed from the rack mechanism 47, i.e., the cassette compartment 55 can be easily removed from the mechanical chassis 3, thereby improving assembly efficiency and serviceability.

While the recording and/or reproducing apparatus according to the present invention is applied to the VCR of compatible type in which the two tape cassettes of small and large sizes can be loaded, the recording and/or reproducing apparatus according to the present invention can, of course, be applied to a VCR in which more than two tape cassettes of different size can be used. In addition, the recording and/or reproducing apparatus according to the present invention can be widely applied to recording and/or reproducing apparatus other than the VCR, such as a video tape recorder in which a reel table movement mechanism, i.e., cassette compartment can be moved by a rack mechanism.

As described above, according to the present invention, there is provided a recording and/or reproducing apparatus in which a supply tape reel and a take-up tape reel around which a magnetic tape is wound as an information recording medium are mounted on a pair of reel tables, a pair of reel tables are supported by reel table holding members, a spacing between the reel tables can be varied by a reel table movement mechanism, more than two tape cassettes of different sizes can be selectively attached to the reel tables and a drive source of the reel table movement mechanism is obtained from a rack mechanism which is slidably moved in unison with a movement of a cassette holder. The recording and/or reproducing apparatus includes a rack mechanism by which a cassette compartment having a cassette holder can be easily removed from a chassis base forming a mechanical deck regardless of any position at which the reel tables are moved. Thus, an assembly efficiency and a serviceability can be improved.

Further, the rack mechanism includes a pair of racks. The racks are in parallel to each other and can be relatively moved through the pinion. The one rack has the engagement recess formed on one end portion thereof and the other rack has the engagement recess formed on one end portion thereof and the latter engagement recess is lifted over the one engagement recess. The cassette holder includes the drive lever which can be moved in the height direction in response to the insertion of tape cassettes of different size. When the drive lever is lowered, the drive lever is engaged with the engagement recess of one rack thereby to slidably move the rack and the drive lever passes the engagement recess of the other rack. When the drive lever is elevated, the drive lever is engaged with the engagement recess of the other rack thereby to slidably move the rack. Thus, the drive lever can be prevented from being disturbed by the racks, and hence the cassette compartment can be easily removed from the mechanical chassis by the simple arrangement.

Further, since one rack of the rack mechanism moves the reel table space to the position corresponding to the small tape cassette and the other rack moves the reel table space to the position corresponding to the large tape cassette, the reel table space can be moved to the positions corresponding to the tape cassettes of different size by selectively driving the two racks.

Furthermore, when the small tape cassette is inserted into the cassette holder, the drive lever is not contacted with the small tape cassette and lowered. When on the other hand the large tape cassette is inserted into the cassette holder, the drive lever is pushed up by the large tape cassette and elevated. Therefore, the drive lever can be positively elevated and lowered in response to the size of the tape cassette, and the switching operation of the drive lever can be made with ease.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A recording and/or reproducing apparatus comprising:

reel table holding members supporting a pair of reel tables upon which a supply reel and a take-up reel are mounted with a magnetic tape being wound around said supply and take-up reels, a reel table movement mechanism for varying a distance between said reel tables so that at least two tape cassettes of different size can be independently mounted to said reel tables, and a rack mechanism which is slid in unison with movement of a cassette holder for driving said reel table movement mechanism so that said cassette holder can be removed from a chassis base forming a mechanical deck regardless of the distance between said reel tables, said rack mechanism including a pair of parallel racks which can be moved relative to one another through a pinion, a first rack of said pair of parallel racks having a first engagement recess formed at one end portion thereof, a second rack of said pair of parallel racks having a second engagement recess formed at one end portion thereof which is positioned over said first rack, and wherein said cassette holder includes a drive lever which is vertically movable in response to the insertion of tape cassettes of different size, said drive lever being movable between a lower position, wherein said drive lever is engaged with said first engagement recess of said first rack to thereby slidably move said first rack, and an upper position, wherein said drive lever is engaged with said second engagement recess of said second rack to thereby slidably move said second rack.

2. A recording and/or reproducing apparatus as claimed in claim 1, in which said one rack of said rack mechanism moves said reel table space to a position corresponding to a small tape cassette and said the other rack moves said reel table space to a position corresponding to a large tape cassette.

3. A recording and/or reproducing apparatus as claimed in claim 1, in which said drive lever is not contacted with a small tape cassette and lowered when said small tape cassette is inserted into said cassette holder and said drive lever is pushed upwardly by a large tape cassette and elevated when said large tape cassette is inserted into said cassette holder.

4. A recording and/or reproducing apparatus comprising:

reel table holding members supporting a pair of reel tables upon which a supply reel and a take-up reel are mounted with a magnetic tape being wound around said supply and take-up reels, a reel table movement mechanism for varying a distance between said reel tables so that at least two tape cassettes of different size can be independently mounted to said reel tables, a rack mechanism which is slid in unison with movement of a cassette holder for driving said reel table movement mechanism, said rack mechanism including first and second parallel racks which can be moved relative to one another with each rack having an engagement recess at an end thereof, and wherein said cassette holder includes a drive lever which is vertically movable in response to the insertion of tape cassettes of different size, said drive lever being movable between a first position, wherein said drive lever is engaged with said engagement recess of said first rack to thereby slidably move said first rack, and an upper position, wherein said drive lever is engaged with said engagement recess of said second rack to thereby slidably move said second rack.

* * * * *